United States Patent [19]

Yamada et al.

[11] 4,119,167
[45] Oct. 10, 1978

[54] STEERING DRIVE AXLE ASSEMBLY

[75] Inventors: Shinichi Yamada; Shigeru Komatsu, both of Osaka, Japan

[73] Assignee: Asano Gear Co., Ltd., Osaka, Japan

[21] Appl. No.: 766,755

[22] Filed: Feb. 8, 1977

[30] Foreign Application Priority Data

Jul. 28, 1976 [JP] Japan .................................. 51-90667

[51] Int. Cl.² .......................... B60K 17/30; F16D 3/00
[52] U.S. Cl. ..................................... 180/43 R; 64/22
[58] Field of Search ..................... 180/43 R, 44 R, 45; 64/22; 280/96.1

[56] References Cited

U.S. PATENT DOCUMENTS

| 1,881,201 | 10/1932 | Livingood | 180/43 R |
| 2,333,911 | 11/1943 | Alden | 180/43 R |
| 2,477,090 | 7/1949 | Roeder et al. | 180/43 R |
| 2,685,184 | 8/1954 | DeNador et al. | 180/43 R |

Primary Examiner—Joseph F. Peters, Jr.
Assistant Examiner—Donn McGiehan
Attorney, Agent, or Firm—Birch, Stewart, Kolasch & Birch

[57] ABSTRACT

A steering drive axle assembly which comprises a steering knuckle having an integral reduced portion rigid with one end of an axle housing, a socket member having its reduced portion secured to internal extremity of a wheel mounting spindle and being supported by a pair of vertically spaced king pins which are respectively mounted to an upper wall and a lower wall of the steering knuckle so that it can move about the king pins. The steering drive axle assembly further comprises a shell housing which includes a substantially semi-spherical portion and a cylindrical extension which extends into rigid engagement with the reduced portion of the steering knuckle, a constant velocity universal joint which connects a drive and a driven shafts together being disposed within the shell housing, and a sealing member being provided in sealing contact against a smoothly spherical outer periphery of the shell housing.

5 Claims, 4 Drawing Figures

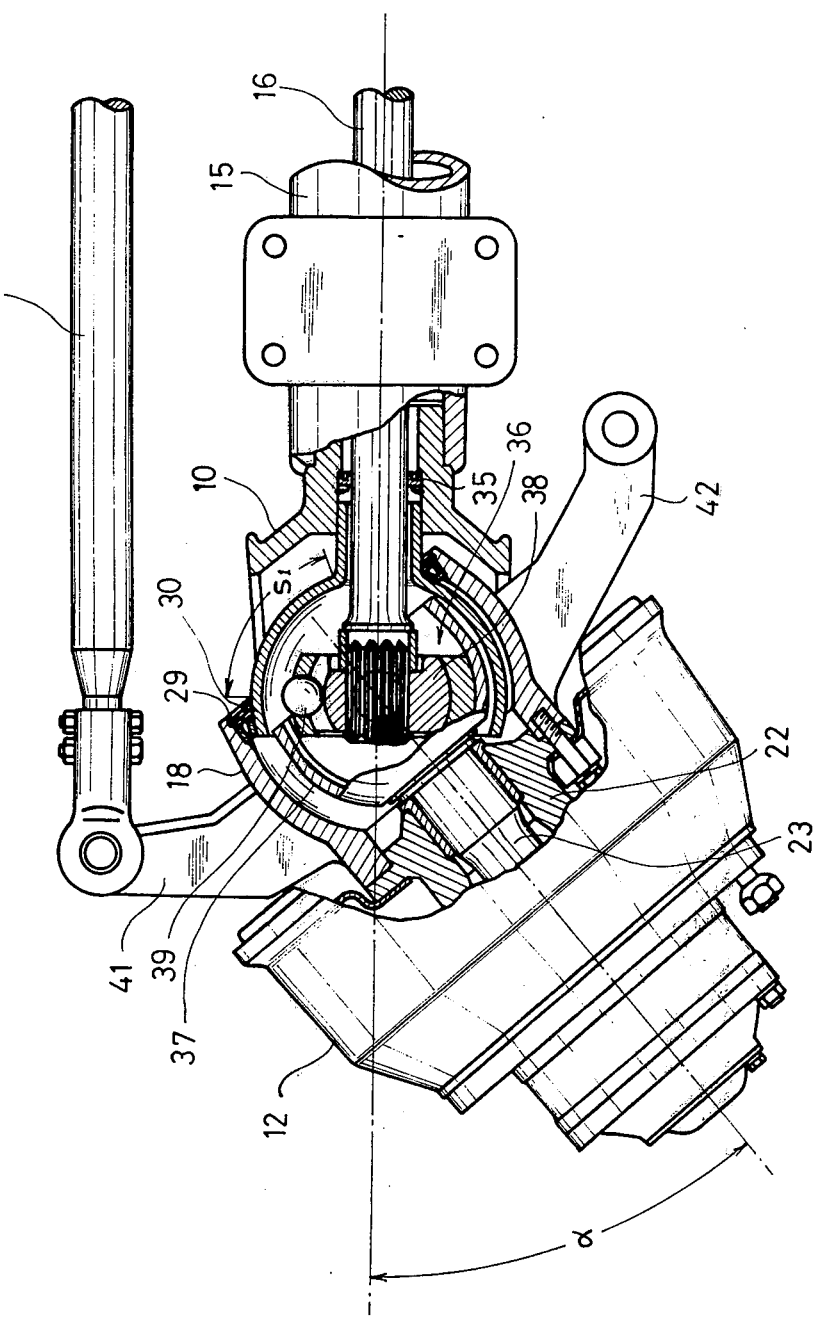

STEERING DRIVE AXLE ASSEMBLY

BACKGROUND AND SUMMARY OF THE INVENTION

The present invention relates to a steering drive axle assembly, and is more particularly directed to an improved type of steering drive axle assembly which ensures a large steering angle and effective hermetical sealing for retention of lubricant and protection of an incorporated constant velocity universal joint.

The conventional steering drive axle assembly comprises a wheel driving axle means, a steering means for turning a vehicle and a constant velocity universal joint connecting a drive shaft and a driven shaft of the axle means together so as to provide a universal driving connection therebetween at a constant velocity. As is well known in the art, the universal joint should be hermetically sealed by suitable sealing arrangements in order to keep out dirt and moisture and prevent the escape of lubricant contained therein. In the conventional structure of a steering drive axle assembly with sealing arrangements, it was almost impossible to provide a sufficient steering angle due to the fact that the sealing arrangements interfere with the steering mobility. More particularly, as can be readily seen from a typical example of the known structure as illustrated in FIGS. 3a and 3b, the conventional assembly has the disadvantage that the maximum steering angle $\beta$ indicated in FIG. 3b is inevitably limited to approximately 30°. The steering angle is limited because when a wheel mounting spindle 1 swings horizontally in one direction about the vertical axis of a pair of coaxially spaced king pins 2, an outer end portion 3 of the steering knuckle 4, where it is bolted to the spindle 1, will very shortly come into collision with the opening end 5 of a bell-shaped member 6. Further, an inner end portion 7 of the steering knuckle 4, where a sealing member 8 is mounted, will also very shortly come into collision with the root of the reduced portion 9 of the bell-shaped member 6. Said collision in a very short time can be avoided only by reducing an effective sealing area $S_2$ (FIG. 3b) on the periphery of the bell-shaped member 6, since the structure does not permit a sufficient angular departure of said portion 7 from said root or that of said portion 3 from said opening end 5. Thus, in the conventional assembly as described in the foregoing, the pivotal movement of the wheel mounting spindle about the king pin axis was limited to a small and insufficient range. As a result, the steering mobility has not been satisfactory.

In order to solve the above mentioned problems, various attempts have been made, wherein one example permits more than 30° steering angle but gives up provision of the sealing arrangements and/or employment of a constant velocity universal joint. This example encounters different disadvantages well known to those skilled in the art. Another example employs a flexible boot-type seal instead of desirable spherical seal. However, it is still difficult to obtain more than a 30° steering angle due to limited elasticity of the boot per se. A further example utilizes a combination of a non-seal type arrangement with a known Double-Cardan type constant velocity universal joint. This last example permits a large steering angle, however, its specific structure always invites a larger dimension, which is of fatal disadvantage for use with small-sized vehicles.

Accordingly, one object of the present invention is to provide an improved steering drive axle assembly which eliminates the problems of the prior art as set forth hereinabove.

Another object of the present invention is to provide a novel steering drive axle assembly with sealing arrangements which permits a larger steering angle.

A further object of the present invention is to provide a steering drive axle assembly with sealing arrangements which is capable of increasing the maximum steering angle up to approximately 42°.

A still further object of the present invention is to provide a steering drive axle assembly with sealing arrangements which permits incorporating a constant velocity universal joint therewith without inviting undesirable large dimension.

A yet further object of the present invention is to provide a steering drive axle assembly which permits effective spherical sealing for lubricant retention and protection of an incorporated constant velocity universal joint.

The above and other objects, features and advantages of the present invention will become more apparent from the following description of one preferred embodiment thereof taken in conjunction with the accompanying drawings. It is to be expressly understood, however, that the drawings are for purpose of illustration only and are not intended as a definition of the limits of the present invention, since various changes and modifications within the spirit and scope of the invention will be apparent to those skilled in the art from the detailed description.

In order to fulfill the above-mentioned objects of the present invention, the steering drive axle assembly with sealing arrangements according to the present invention comprises a steering knuckle having its reduced portion secured to one end of an axle housing and a socket member having its reduced portion secured to the internal extremity of a wheel mounting spindle. The socket member is supported by a pair of vertically spaced king pins, each of which is mounted respectively to an upper wall and a lower wall of the steering knuckle for movement about the king pins. The steering drive axle assembly further comprises a shell housing which includes a substantially semi-spherical portion and an integral reduced extension secured to the internal of the steering knuckle, said shell housing receiving a constant velocity universal joint. A sealing member is provided in sealing contact against the smooth spherical outer periphery of the shell housing to keep the universal joint hermetically sealed for the protection and lubricant retention.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a top plan view, with parts broken away, of the assembly of FIG. 1, showing the axle structure and the sealing arrangements when a wheel mounting spindle has been turned to the maximum degree in one horizontal direction during the steering operation of a vehicle;

DESCRIPTION OF THE PREFERRED EMBODIMENT

Figure 1:
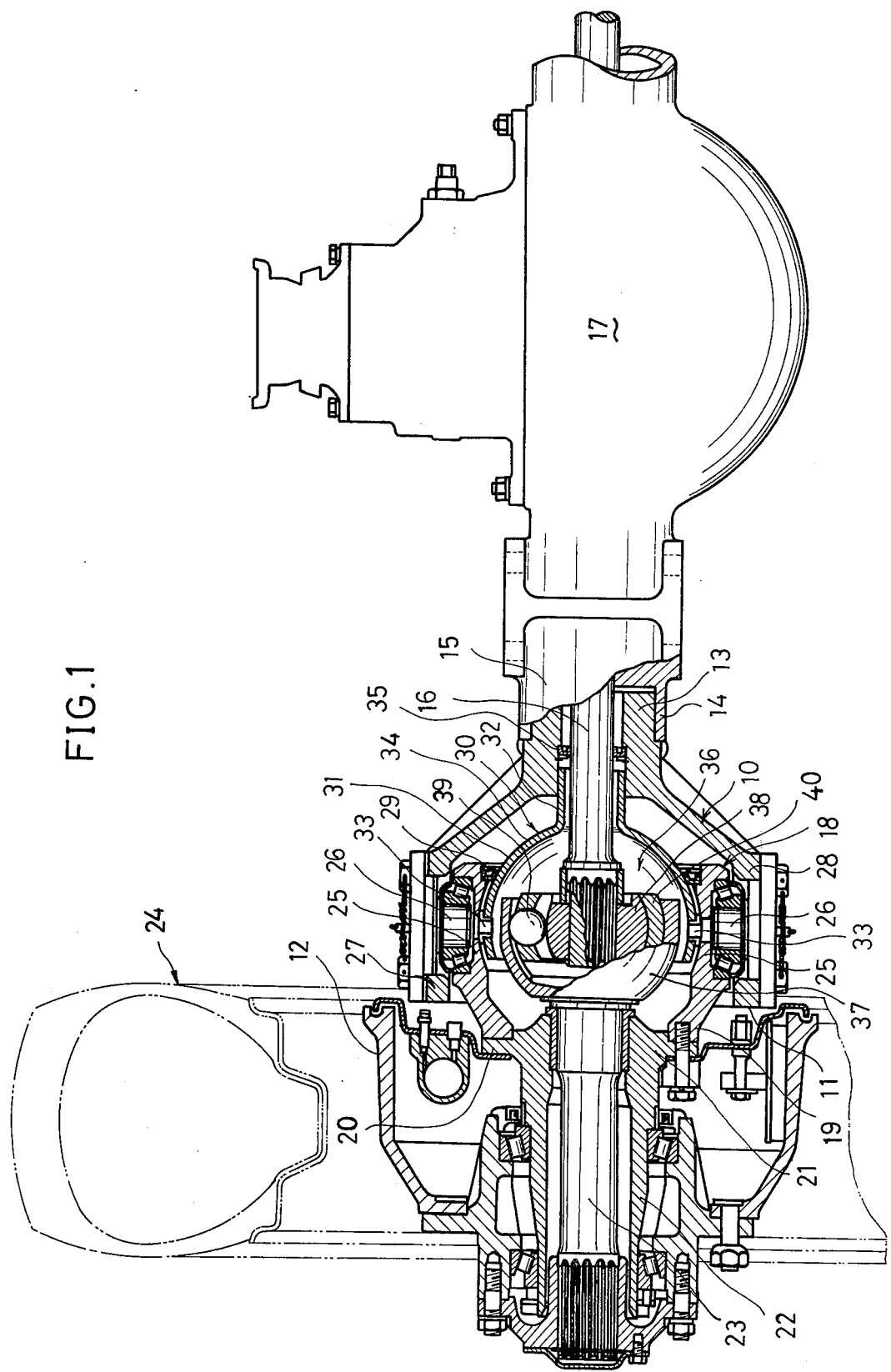
FIG. 1 is a fragmentary elevation partly in section, showing the novel structure of a steering drive axle assembly of the present invention together with its known environments.

Referring now to the drawings, in particular to FIGS. 1 and 2, the steering drive axle assembly of the present invention comprises a steering knuckle 10 which is arranged in the manner that its enlarged opening end 11 is directed toward a known wheel hub 12 and its reduced cylindrical portion 13 is rigidly secured to one end 14 of an axle housing 15 by welding or the like. A drive shaft 16 is rotatably supported in said axle housing 15 and connected to a conventional differential drive means 17 in the conventional manner as shown in FIG. 1. Within said steering knuckle 10 is partly received a socket member or outer spherical housing 18 which has an integral reduced portion 19 bolted to an integral flange 20 formed with the inward extremity 21 of a wheel mounting spindle 22 which supports a driven shaft 23 rotatably therein. The spindle 22 carries the wheel hub 12 on which a vehicle wheel 24 is bearingly mounted in a conventional manner. Said socket member 18 is supported at its enlarged portion 25 by a pair of king pins 26 which are vertically spaced in coaxial alignment and connected respectively to the upper and the lower walls 27, 28 of the enlarged portion of the steering knuckle 10. In this arrangement the socket member 18 can move on a horizontal plane about the king pin axis. On the internal periphery of the opening end of said socket member 18 a sealing member 29, which is preferably in the form of an annular oil seal, is mounted.

Within said socket member 18 is disposed a shell housing or inner spherical housing 30 which includes a substantially semi-spherical portion 31 and a reduced cylindrical extension 32 formed integral therewith. The shell housing 30 is held in position since said cylindrical extension 32 extends into rigid engagement with said reduced portion 13 of the steering knuckle 10. Preferably, a pair of pivot shafts 33 may be provided so that they are vertically spaced in coaxial alignment and connected respectively to the upper and the lower walls of said socket member 18, in order that the shell housing 30 can be more firmly held in position and also can swing horizontally about the common axis of said pair of pivot shafts 33. Further, it is desirable that a pair of said pivot shafts 33 be disposed so as to share the common vertical axis with a pair of said king pins 26. Said sealing member or oil seal 29 is urged so as to be in sealing contact against the smoothly spherial outer surface 34 of the shell housing 30 for sealing purposes. Also for sealing purposes a further sealing member or oil seal 35 is provided adjacent the end wall of said cylindrical extension 32 disposed within the axially extending bore of the axle housing 15.

A known constant velocity universal joint 36 is disposed within said shell housing 30 for connecting the drive and the driven shafts 16, 23 together for the purpose of conventional torque transmission. In the illustrated embodiment, a ball type universal joint 36 is employed, however, other types of constant velocity universal joint may be replaced therefor so as to meet a specific character of a vehicle on which the assembly is used. The universal joint 36 comprises an outer race 37, an inner race 38 and a plurality of balls 39 retained in a ball cage 40. Said inner race 38 is connected in splined relation with the drive shaft 16, while said outer race 37 which is substantially semi-spherical in configuration is rigidly fixed at its reduced portion to the internal extremity of the driven shaft 23.

Further, said socket member 18 is conventionally formed with a tie rod arm 41 and a steering arm 42, both of which extend oppositely therefrom. The steering arm 42 is connected with the usual steering linkage leading to a steering handle, and said tie rod arm 41 is pivotally connected with a tie rod 43 for the known purpose. The remainder of the steering drive axle assembly of the present invention is generally assembled conventionally.

In operation, the driving torque generated by a vehicle engine (not shown) is transmitted through the differential drive means 17 to the drive shaft 16, and then delivered through the universal joint 36 to the driven shaft 23 at a constant velocity and then to the wheel hub 12 to rotate the wheel 24 conventionally. Various loads involved such as radial, thrust and torsional loads imparted to vehicle wheels during driving are carried in cooperation of the axle housing 15, the steering knuckle 10, the socket member 18 and the wheel mounting spindle 22. The steering force derived from a steering handle (not shown) is transmitted through a drag link (not shown) and other known devices to the steering arm 42 to move the socket member 18 about the king pins 26 together with the wheel mounting spindle 22 and the wheel hub 12, whereby the vehicle wheel 24 can be positioned for a turn. In this operation, as the steering knuckle 10 is secured to the axle housing 15 while the socket member 18 is secured to the wheel mounting spindle 22 so as to pivotally move about the king pin axis, the steering knuckle 10 does not interfere with the steering mobility. Further, the shell housing 30 is allowed to swing horizontally within the socket member 18 about said pivot shafts coaxial with said king pins to provide thereby a steering angle $\alpha$ which is larger than that of the prior art assembly, as clearly shown in FIG. 2. This angle may be increased up to 42° to increase the steering mobility. Further, different from the prior art arrangements, the sealing member 29 is interposed between the socket member 18 and the shell housing 30 so as to provide a sufficiently large sealing area $S_1$(FIG. 2). Thus, the present invention provides the desired large steering mobility while maintaining its sealing effectiveness during the entire steering operation. By provision of a pair of pivot shafts 33 which share the common vertical axis with the king pins 26, the center of turning of the shell housing 30 lies on said common axis, which is advantageous in operation.

It should be noted that the steering drive axle assembly of the present invention can be used not only for front-wheel drive vehicles but also for rear-wheel drive vehicles.

Figures 3A, 3B:
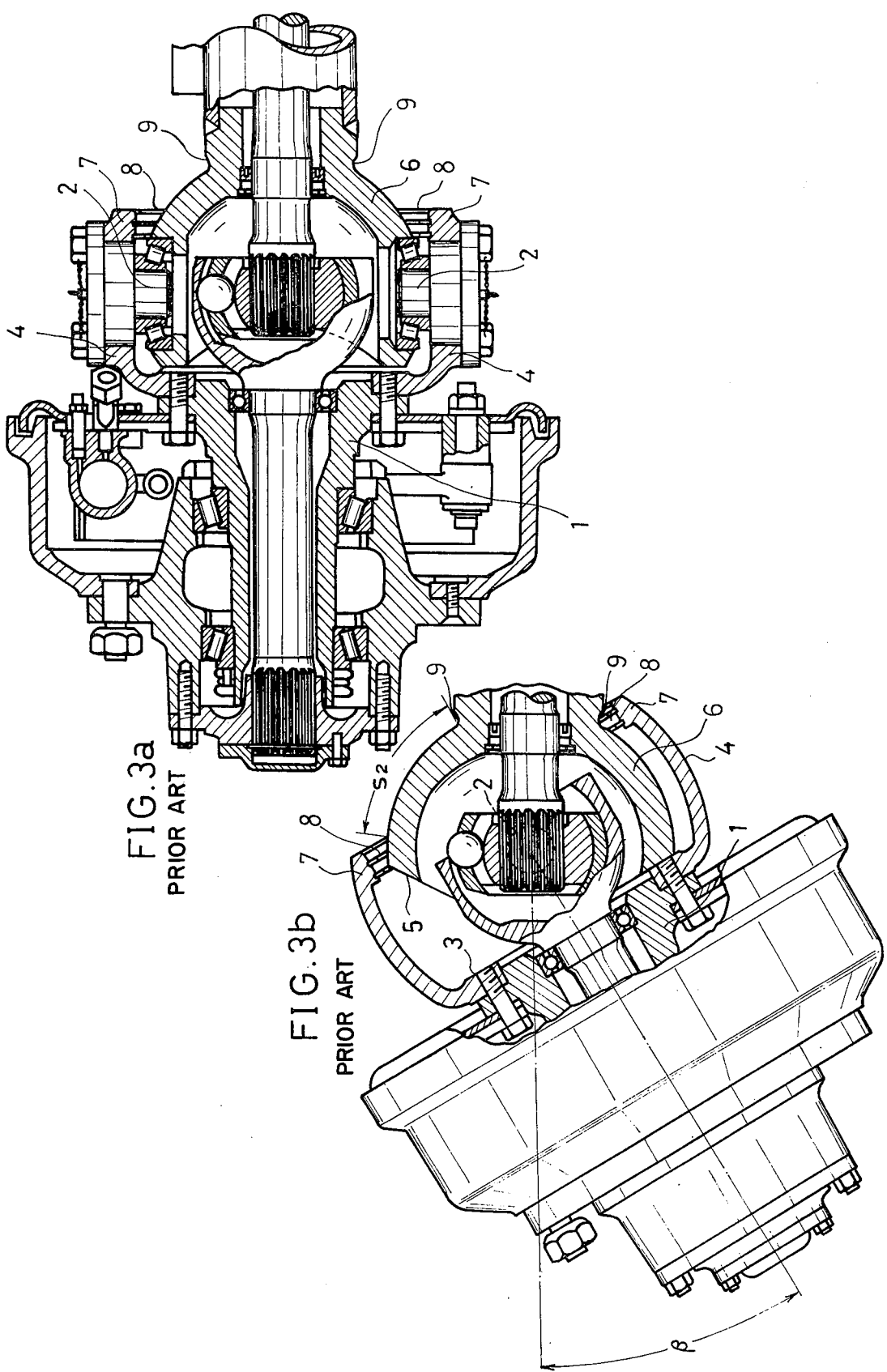
FIG. 3a is a somewhat enlarged fragmentary elevational view, partly in section, taken in the same position with that of FIG. 1, illustrating one example of the conventional structure of a steering drive axle assembly with sealing arrangements.
FIG. 3b is a similar view to FIG. 2, showing a plan view of the conventional assembly of FIG. 3a, in which a wheel mounting spindle takes a position for a turn to the maximum degree.

The prior art illustrated in FIGS. 3a and 3b is the steering drive axle assembly which was actually produced in 1960 and some years thereafter by Asano Gear Co., Ltd., Osaka, Japan, Assignee of the present invention. The Applicants believe the structure of this prior art model of Asano Gear Co., Ltd. to be the most similar to that of the present invention. However, the suitable material relevant to this prior art is now unavailable.

Therefore, representative of the prior art are copies of the entire pages of General Engineering Bulletin 1960 of F-235 Front Driving Axle proposed by ROCKWELL-STANDARD CORPORATION, Detroit 32, Mich., U.S.A., which is directed to a similar type steering drive axle assembly. The structure of this assembly is quite similar to that of the prior art assembly illustrated in FIGS. 3a and 3b. The present invention is distinguishable from the teachings of the General Engineering Bulletin 1960 of ROCKWELL-STANDARD CORPORATION as well as the model of Asano Gear Co., Ltd., as illustrated in FIGS. 3a and 3b, for the following reasons:

1. The steering drive axle assembly in the cited prior art is provided with a single spherical housing connected to an axle housing, whereas the steering drive axle assembly of the present invention is provided with an outer spherical housing or socket member connected to the internal extremity of a wheel mounting spindle and an inner spherical housing or shell housing connected to the internal of a steering knuckle.

2. Due to the above difference in construction between the present invention and the cited prior art, the steering drive axle assembly according to the present invention permits a larger steering angle than that of the cited prior art assembly.

It is readily apparent that the steering drive axle assembly of the present invention is structurally different when compared to the cited prior art assembly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A steering drive axle assembly which comprises:
   a steering knuckle having an integral reduced portion rigid with one end of an axle housing;
   a socket member having its integral reduced portion secured to an internal extremity of a wheel mounting spindle, said socket member being supported by a pair of substantially vertically spaced king pins which are in coaxial alignment and mounted respectively to an upper wall and a lower wall of said steering knuckle so as to be movable about said king pins;
   a shell housing which includes a substantially semi-spherical portion and an integral reduced extension each of which is hollow, said substantially semi-spherical portion being provided with a smoothly spherical outer periphery and disposed within said socket member;
   said reduced extension being secured at one end to an inside wall of said steering knuckle;
   a constant velocity universal joint which connects a drive shaft and a driven shaft together being received within said shell housing; and
   at least one sealing member being provided in sealing contact against said smoothly spherical outer periphery of said shell housing.

2. The steering drive axle assembly of claim 1, wherein said shell housing is supported by a pair of substantially vertically spaced pivot shafts which are in coaxial alignment with a pair of said king pins and mounted respectively to an upper wall and a lower wall of said socket member, said shell housing being movable about a pair of said pivot shafts.

3. The steering drive axle assembly of claim 1, wherein said reduced extension of said shell housing is cylindrical in configuration and partly received within an axially extending bore of said integral reduced portion of said steering knuckle.

4. The steering drive axle assembly of claim 1, wherein said sealing member is an oil seal which is interposed between said socket member and said shell housing, said oil seal being mounted to an internal circumference of an opening end of said socket member.

5. The steering drive axle assembly of claim 1, wherein said constant velocity universal joint is a ball type universal joint which comprises an outer race, an inner race and a plurality of balls retained in a ball cage, said inner race being connected to said drive shaft extending through said axle housing and said reduced extension of said shell housing, said outer race which is substantially semi-spherical in configuration being rigidly secured at its reduced portion to an internal extremity of said driven shaft which is rotatably supported within said wheel mounting spindle.

* * * * *